(12) United States Patent
Fukumoto (10) Patent No.: US 9,557,732 B2
(45) Date of Patent: Jan. 31, 2017

(54) NUMERICAL CONTROLLER HAVING PROGRAM RESUMING FUNCTION

(71) Applicant: FANUC Corporation, Minamitsuru-gun, Yamanashi (JP)

(72) Inventor: Akinobu Fukumoto, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 341 days.

(21) Appl. No.: 14/471,570

(22) Filed: Aug. 28, 2014

(65) Prior Publication Data

US 2015/0073582 A1    Mar. 12, 2015

(30) Foreign Application Priority Data

Sep. 9, 2013   (JP) .................................. 2013-186710

(51) Int. Cl.
*G05B 19/4155*   (2006.01)
*G05B 19/4067*   (2006.01)

(52) U.S. Cl.
CPC ....... *G05B 19/4155* (2013.01); *G05B 19/4067* (2013.01); *G05B 2219/32001* (2013.01); *G05B 2219/50104* (2013.01)

(58) Field of Classification Search
None
See application file for complete search history.

(56) References Cited

U.S. PATENT DOCUMENTS

| 5,984,506 A | 11/1999 | Robbiani et al. |
| 2005/0209730 A1 | 9/2005 | Grund et al. |
| 2006/0149411 A1 | 7/2006 | Kochiya et al. |
| 2006/0287736 A1 | 12/2006 | Onishi et al. |
| 2009/0055016 A1 | 2/2009 | Fujibayashi et al. |
| 2011/0190915 A1 | 8/2011 | Fujishima et al. |

FOREIGN PATENT DOCUMENTS

| CN | 1862431 A | 11/2006 |
| JP | H06-202723 A | 7/1994 |
| JP | H10-43953 A | 2/1998 |
| JP | 2000-035815 A | 2/2000 |
| JP | 2002-014709 A | 1/2002 |
| JP | 2005-288612 A | 10/2005 |
| JP | 2006-506719 A | 2/2006 |

(Continued)

OTHER PUBLICATIONS

Decision to Grant Patent dispatched Aug. 4, 2015 in Japanese Patent Application No. 2013186710 (3 pages) with English Translation (3 pages).

*Primary Examiner* — Mohammad Ali
*Assistant Examiner* — Saad M Kabir
(74) *Attorney, Agent, or Firm* — Drinker Biddle & Reath LLP (57) ABSTRACT

A numerical controller restores internal data of an NC section, shifts to a machining resumption temporary suspension state, and passes an identification number extracted from NC section program resumption block data to a PMC section. The PMC section, when receiving the identification number, restores a signal state of the PMC section and a state of a peripheral machine section, and, when the restoration is completed, notifies the NC section of the completion of the restoration. Then, the NC section cancels the machining resumption temporary suspension state and shifts to a state in which machining can be resumed.

4 Claims, 7 Drawing Sheets

(56) References Cited

FOREIGN PATENT DOCUMENTS

| | | |
|---|---|---|
| JP | 2006-172388 A | 6/2006 |
| JP | 2007-213241 A | 8/2007 |
| JP | 2009-053801 A | 3/2009 |
| JP | 4549051 B2 | 9/2010 |
| JP | 2011-158979 A | 8/2011 |

NUMERICAL CONTROLLER HAVING PROGRAM RESUMING FUNCTION

RELATED APPLICATION DATA

This application claims priority under 35 U.S.C. §119 and/or §365 to Japanese Application No. 2013-186710 filed Sep. 9, 2013, the entire contents is incorporated herein by reference.

BACKGROUND OF THE INVENTION

1. Field of the Invention

The present invention relates to a numerical controller that controls a machine tool, the numerical controller having a program resuming function for facilitating re-execution of a machining program after execution suspension of the machining program.

2. Description of the Related Art

A numerical controller having a program resuming function for facilitating re-execution of a machining program after execution suspension of the machining program has been publicly known.

In the conventional program resuming function, for example, as disclosed in Japanese Patent Application Laid-open No. 2009-53801, in preparation for suspension of machining of a workpiece, program resumption block data for resuming the machining of the workpiece is acquired during the machining of the workpiece. The program resumption block data includes data necessary for a program resumption such as a block number of a block being executed in a machining program, a start point and an end point of the block being executed, various kinds of modal information of the block being executed, a number of a master program and a block position for calling a sub-program, and a total number of blocks from the master program to the block being executed.

However, to actually resume workpiece, it is necessary to restore, according to a block in which the machining is resumed, not only a state of a block commanded by the numerical controller but also states of a programmable machine controller section (PMC section) to which an input-output interface is connected, a programmable logic controller (PLC) or a computer connected to an interface of a numerical control section (NC section), or the like and peripheral machine sections connected to the programmable machine controller section, the programmable logic controller, or the computer (hereinafter collectively referred to as "PMC section").

For restoring the state of the PMC section, an operator checks contents of a machining program, selects necessary auxiliary functions (signal state changing commands), and manually command the auxiliary functions. This technique is known, though there is no description in above mentioned Japanese Patent Application Laid-open No. 2009-53801. If the machining of the workpiece is resumed while the state of the PMC section cannot be correctly restored, it is likely that the workpiece and tools are broken.

As measures against this likelihood, Japanese Patent Application Laid-open No. 6-202723 discloses a method of, in re-executing a machining program from a position of suspension of the machining program, comparing states of a machine during the suspension and during the re-execution of the machining program and generating a restoring program to enable a state of the machine to be returned to the state during the suspension. Japanese Patent Application Laid-open No. 10-43953 (corresponding to U.S. Pat. No. 5,984,506) discloses a method of storing control data representing a machining state while machining is executed and returning the control data when the machining is resumed.

In Japanese Patent Application Laid-open No. 6-202723 mentioned above, a number of a tool in use, the number of revolutions of a spindle, and an M command state are stored during the machining suspension and commands for restoring the number of the tool in use, the number of revolutions of the spindle, and the M command state are generated as a restoring program. However, when there is a function of changing the state of the machine not via the commands, it is difficult to restore the state of the machine. For example, when there is a function of changing a feed speed override and a spindle speed override according to a cutting load, it is difficult to restore states of the overrides only from the information explained above.

The technique described in Japanese Patent Application Laid-open No. 10-43953 mentioned above relates to a method of classifying the control data into static control data and dynamic control data and storing and restoring the control data. The dynamic control data is always stored to restore the state of the machine during the machining suspension. However, the technique is based on the premise that all data are unitarily managed. For example, when necessary data is separated and present in the NC section and the PMC section and independently managed in the NC section and the PMC section, the technique cannot be adapted to a resumption and execution of the machining program.

Some command is described as a single auxiliary function on a program but is recognized as an aggregate of a series of plurality of machine operation commands in a numerical controller. Japanese Patent Application Laid-open No. 2000-35815 discloses that, if the numerical controller executes the series of the plurality of machine operation commands, when an operation is suspended halfway in the auxiliary function, the remaining machine operation command is re-executed. However, this technique is not for restoring the state of the machine but for re-executing the remaining operation of the suspended auxiliary function.

SUMMARY OF THE INVENTION

Therefore, it is an object of the present invention to provide a numerical controller having a program resuming function capable of accurately restoring a state on a machine side (a PMC section, a computer section, or a peripheral machine section) when machining is resumed and preventing damage to workpiece and tools due to a restoration mistake.

A numerical controller according to the present invention has a program resuming function and includes an NC section that sequentially reads out blocks of a machining program to thereby control a motor connected to the numerical controller; and a PMC section that controls an input-output interface mounted on the numerical controller to control a peripheral machine section connected to the input-output interface. The numerical controller controls each of the NC section and the PMC section to perform machining of a workpiece. The numerical controller has the program resuming function for detecting in advance, with the NC section during execution of machining, an uncut block in which the machining of the workpiece is easily resumed, in order to resume the machining of the workpiece when the machining of the workpiece is suspended, storing one or a plurality of items of information concerning the uncut block in a memory of the NC section as NC section program resumption block data, and performing resumption of the machining of the workpiece on the basis of the NC section program resumption block data arbitrarily selected after the machining of the workpiece is suspended. The numerical controller further includes: an NC section program resumption block data identification number storing section that adds, when the information concerning the uncut block is stored as the NC section program resumption block data during execution of machining of the workpiece, a unique identification number to the information concerning the uncut block and stores the information concerning the uncut block; an NC section identification number output section that outputs the identification number added to the NC section program resumption block data corresponding to the signal state change command, to the PMC section, every time a signal state change command (an auxiliary function) for outputting a signal from the NC section to the PMC section is executed by the NC section for the purpose of causing the PMC section to perform mainly operation of the peripheral machine section during execution of machining of the workpiece, and notifies the PMC section of timing for storing data necessary for the resumption; and a PMC section program resumption block data storing section that stores the PMC section program resumption block data, which is data necessary for the PMC section to resume the machining, and the identification number in association with each other, in a memory of the PMC section, at a timing when the identification number is output by the NC section identification number output section, in the PMC section.

The numerical controller may include: an NC section machining-resumption temporarily-suspending section that temporarily suspends, when any one of the NC section program resumption block data is designated and the program resuming function is started after the machining is suspended, a machining resuming operation of the NC section halfway in a process for resuming the machining of the workpiece on the basis of the designated NC section program resumption block data; an NC section resumption time identification number output section that outputs an identification number of the NC section program resumption block data designated at the start of the program resuming function, to the PMC section, after detecting that the machining resuming operation of the NC section is temporarily suspended by the NC section machining-resumption temporarily-suspending section, and notifies the PMC section of timing for restoring the state; a PMC section signal state restoring section that causes the PMC section to restore a signal state of the numerical controller and a state of the peripheral machine section on the basis of the identification number, at a timing when the identification number is output from the NC section to the PMC section; a PMC section signal state restoration-completion notifying section that notifies, when the restoration of the signal state and the state of the peripheral machine section is completed, the NC section of the completion; and an NC section machining resumption continuing section that causes the NC section to continue the resumption of the machining suspended by the NC section machining-resumption temporarily-suspending section, in response to the restoration of the signal state by the PMC section signal state restoration-completion notifying section.

The numerical controller may connect an external apparatus including a PLC or a computer to the NC section and causes the external apparatus to perform the operations executed by the PMC section.

According to the present invention, since the numerical controller includes the configuration explained above, it is possible to accurately restore a state on a machine side (a PMC section, a computer section, and a peripheral machine section) when machining is resumed and prevent damage to a workpiece and tools due to a restoration mistake.

BRIEF DESCRIPTION OF THE DRAWINGS

The objects and the characteristics explained above and other objects and characteristics of the present invention will be made apparent from the embodiments explained below with reference to the accompanying drawings. Among the drawings.

DESCRIPTION OF THE PREFERRED EMBODIMENTS

Figure 1:
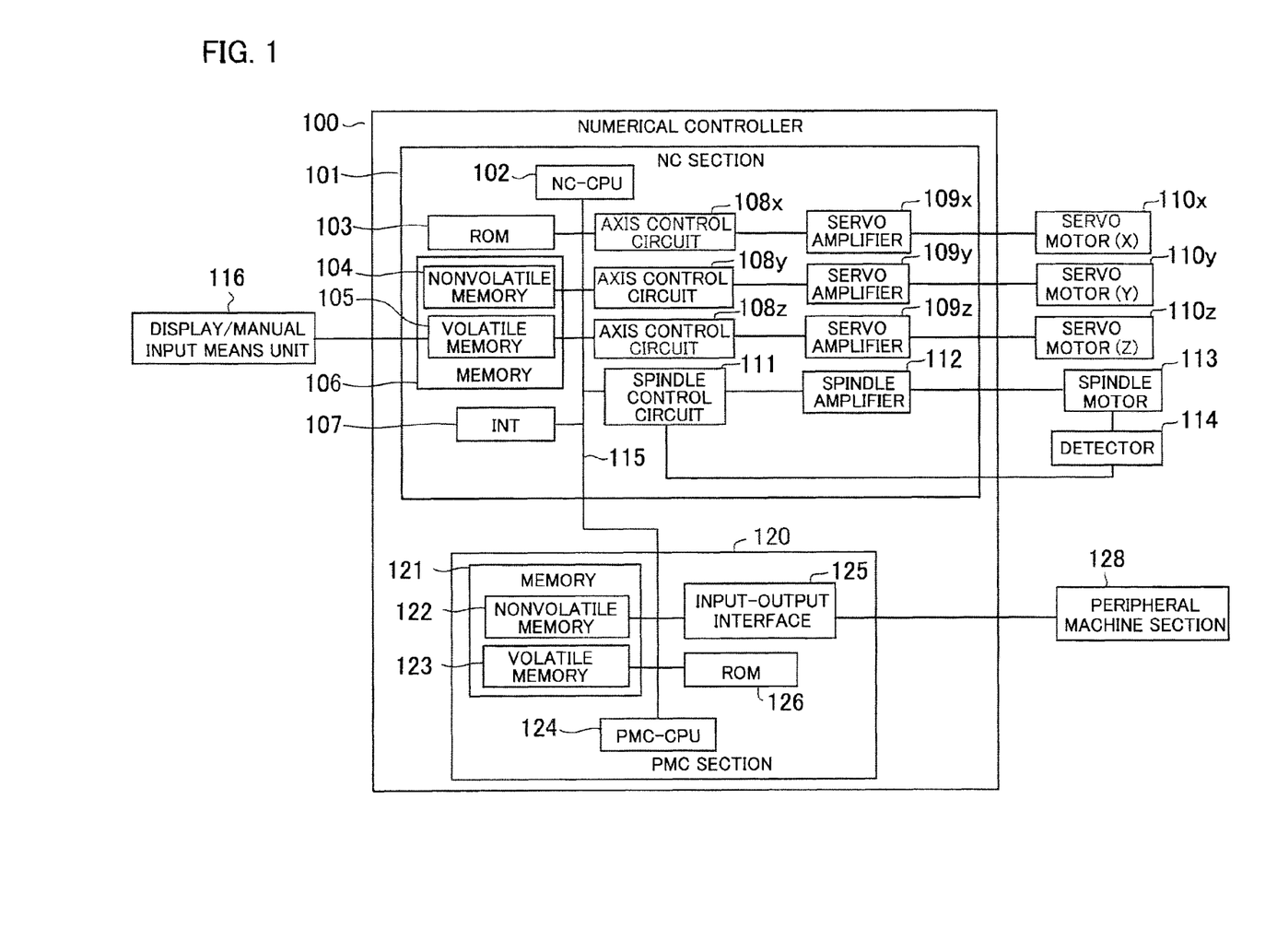
FIG. 1 is a block diagram for explaining main parts of a numerical controller and an external machine apparatus.

FIG. 1 is a block diagram for explaining main parts of a numerical controller and an external machine apparatus.

A numerical controller 100 includes an NC section 101 and a PMC section 120 and controls the NC section 101 and the PMC section 120 to perform machining of a workpiece. The NC section 101 sequentially reads out blocks of a machining program registered in a memory 106 (a nonvolatile memory 104 or a volatile memory 105) and analyzes and executes the blocks to thereby control motors 110$x$, 110$y$, and 110$z$ of respective axes connected to the numerical controller 100 and a spindle motor 113. The PMC section 120 controls an input-output interface 125 mounted on the numerical controller 100 to control a peripheral machine section 128 connected to the input-output interface 125.

The motors 110$x$, 110$y$, and 110$z$ of the axes (an X axis, a Y axis, and a Z axis) are controlled to be driven by axis control circuits 108$x$, 108$y$, and 108$z$ of the axes and servo amplifiers 109$x$, 109$y$, and 109$z$ of the axes. A detector 114 detects rotating speed of the spindle motor 113 and feeds back a signal of the detected rotating speed to a spindle control circuit 111. The spindle motor 113 is controlled to be driven by the spindle control circuit 111 and a spindle amplifier 112.

An NC-CPU 102 is a processor that comprehensively controls the numerical controller 100. The NC-CPU 102 reads out a system program stored in a ROM 103 via a bus 115 and controls the entire numerical controller 100 according to the read-out system program. In the volatile memory 105, temporary calculation data, display data, and various data input by an operator via a display/manual input means unit 116 are stored. An interface 107 is an interface for connecting an external storage device and apparatuses (not shown in the figure) such as a PLC and a computer on the outside.

The PMC section (programmable machine controller section) 120 includes a processor of a PMC-CPU 124. The PMC section 120 receives a signal state change command (a command for auxiliary functions such as an M function, an S function, and a T function) from the NC section 101 via the bus 115. The PMC section 120 subjects the signal state change command to decoding processing according to a sequence program stored in the ROM 126. The PMC section 120 outputs an output signal for controlling the peripheral machine section 128 of the machine tool to the peripheral machine section 128 via the input-output interface 125. The PMC section 120 includes a memory 121 including a nonvolatile memory 122 and a volatile memory 123. In the nonvolatile memory 122 or the volatile memory 123, data necessary for machining resumption is stored. As explained below, the data necessary for the machining resumption is attached with an identification number "unique" to program resumption block data and stored in the memory 121. Here, an identification number "unique" is an identification number that is additionally attached to recognize how many times the block was executed if the same block on a machining program is executed a plurality of number of times according to, for example, a macro command, when the machine tool machines a workpiece according to a machining program.

Figure 2:
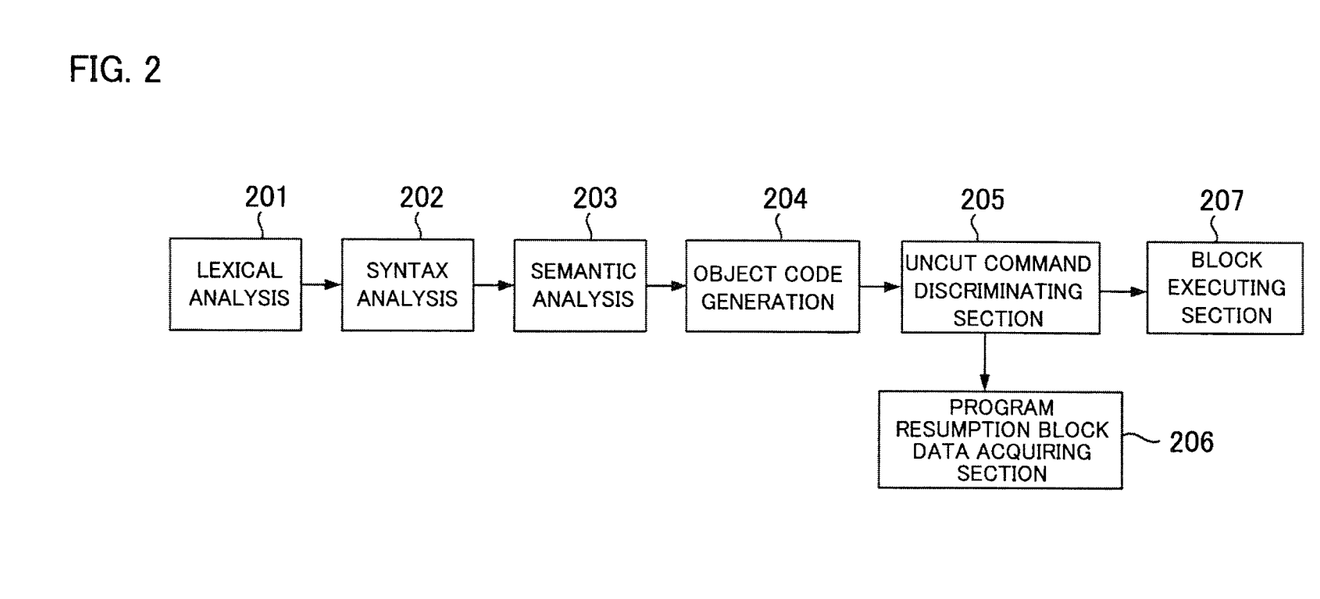
FIG. 2 is a block diagram showing a process for detecting, in an NC section, an uncut command (block) during execution of machining and storing information concerning the uncut block in a memory of the NC section as program resumption block data.

FIG. 2 is a block diagram showing a process for detecting an uncut block with the NC section during execution of machining and storing information concerning the detected uncut block in the memory of the NC section as program resumption block data.

A machining program is separated into alphabetical letters and numerical symbols by a lexical analysis 201. Subsequently, the NC section 101 performs a syntax analysis 202 for, for example, determining what a numerical value of a G command of the alphabetical letters is. The NC section 101 performs a semantic analysis 203 for, for example, specifying a function of the G command according to the numerical value of the G command and executing processing for the function. The NC section 101 performs object code generation 204 for converting a result of the semantic analysis 203 into an object code. An uncut command discriminating section 205 discriminates an uncut command from the command converted into the object code. When the discriminated command is the uncut command, a program resumption block data acquiring section 206 acquires and stores program resumption block data. A block executing section 207 controls, according to the generated object code, the motors connected to the numerical controller 100 and the peripheral machine section 128 connected via the PMC section 120 to perform machining of a workpiece.

Figure 3:
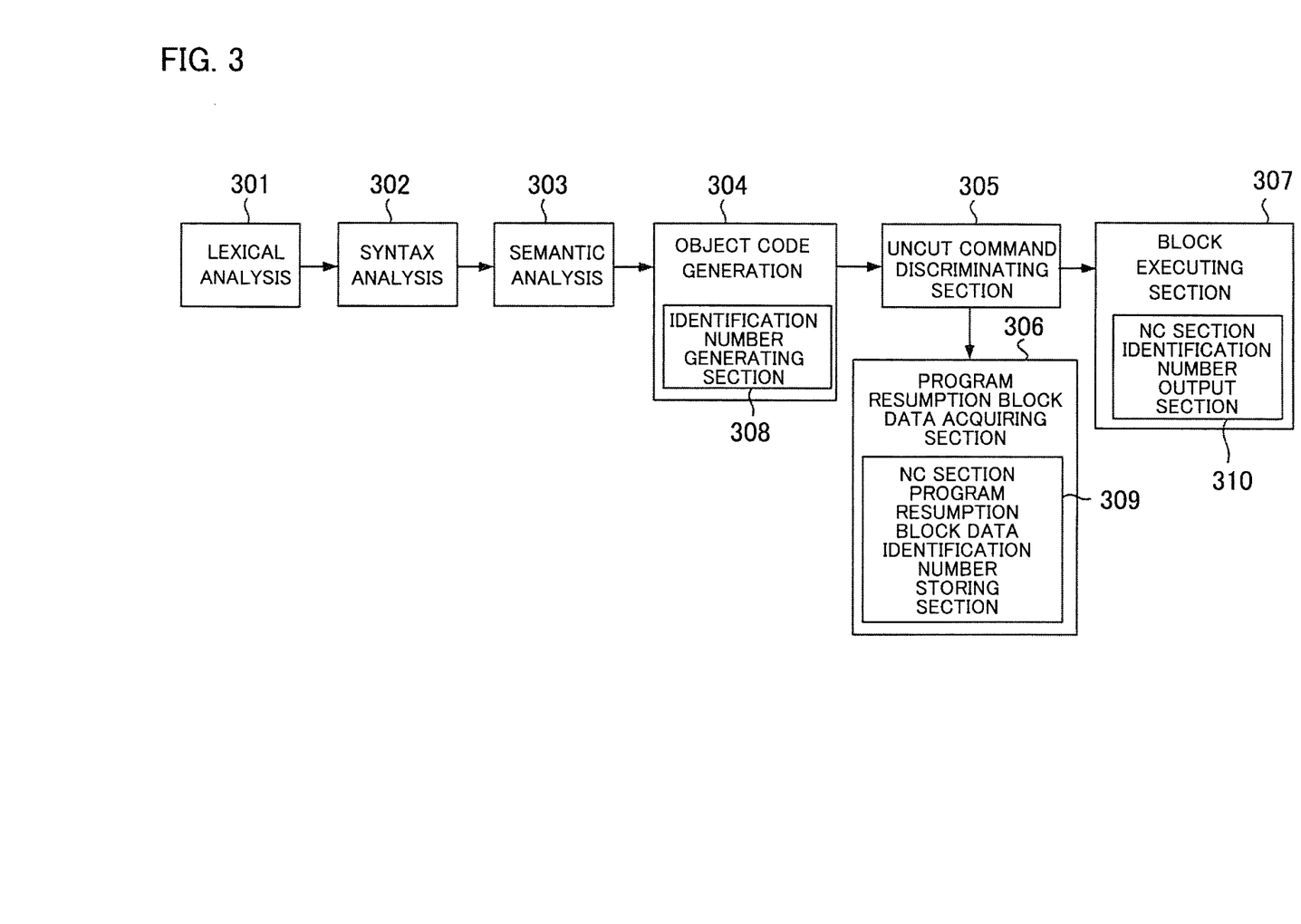
FIG. 3 is a block diagram for explaining an NC section program resumption block data identification number storing section and an NC section identification number output section.

FIG. 3 is a block diagram showing an NC section program resumption block data identification number storing section and an NC section identification number output section.

A lexical analysis 301, a syntax analysis 302, a semantic analysis 303, object code generation 304, an uncut command discriminating section 305, a program resumption block data acquiring section 306, and a block executing section 307 in FIG. 3 respectively corresponds to the lexical analysis 201, the syntax analysis 202, the semantic analysis 203, the object code generation 204, the uncut command discriminating section 205, the program resumption block data acquiring section 206 and the block executing section 207 in the block diagram of FIG. 2.

An identification number is generated by an identification number generating section 308 during the object code generation 304 and embedded as a part of an object code. The identification number generating section 308 generates a unique number for each of objects according to a method of, for example, adding 1 to a number embedded in the immediately preceding object.

Subsequently, the uncut command discriminating section 305 discriminates an uncut command from a command converted into the object code. When the discriminated command is the uncut command, the program resumption block data acquiring section 306 acquires and stores program resumption block data. An NC section program resumption block data identification number storing section 309 extracts an identification number from the object code and stores the identification number as a part of NC section program resumption block data.

The block executing section 307 controls, according to the generated object code, the motors connected to the numerical controller 100 and the peripheral machine section 128 connected via the PMC section 120 and performs machining of a workpiece. When the object code is a signal state change command, an NC section identification number output section 310 extracts the identification number from the object code and outputs the identification number to the PMC section 120. That is, the identification number is communicated from the NC section 101 in response to an interface signal (not shown in the figure) between the NC section 101 and the PMC section 120. When the signal state change command is executed by the original action of the block executing section 307, an auxiliary function code or the like is communicated by the NC section 101 in response to an interface signal between the NC section 101 and the PMC section 120. At the signal of the communication of the auxiliary function code or the like, the PMC section 120 manipulates an interface signal of the input-output interface 125 (see FIG. 1) and actuates the peripheral machine section 128.

Figure 4:
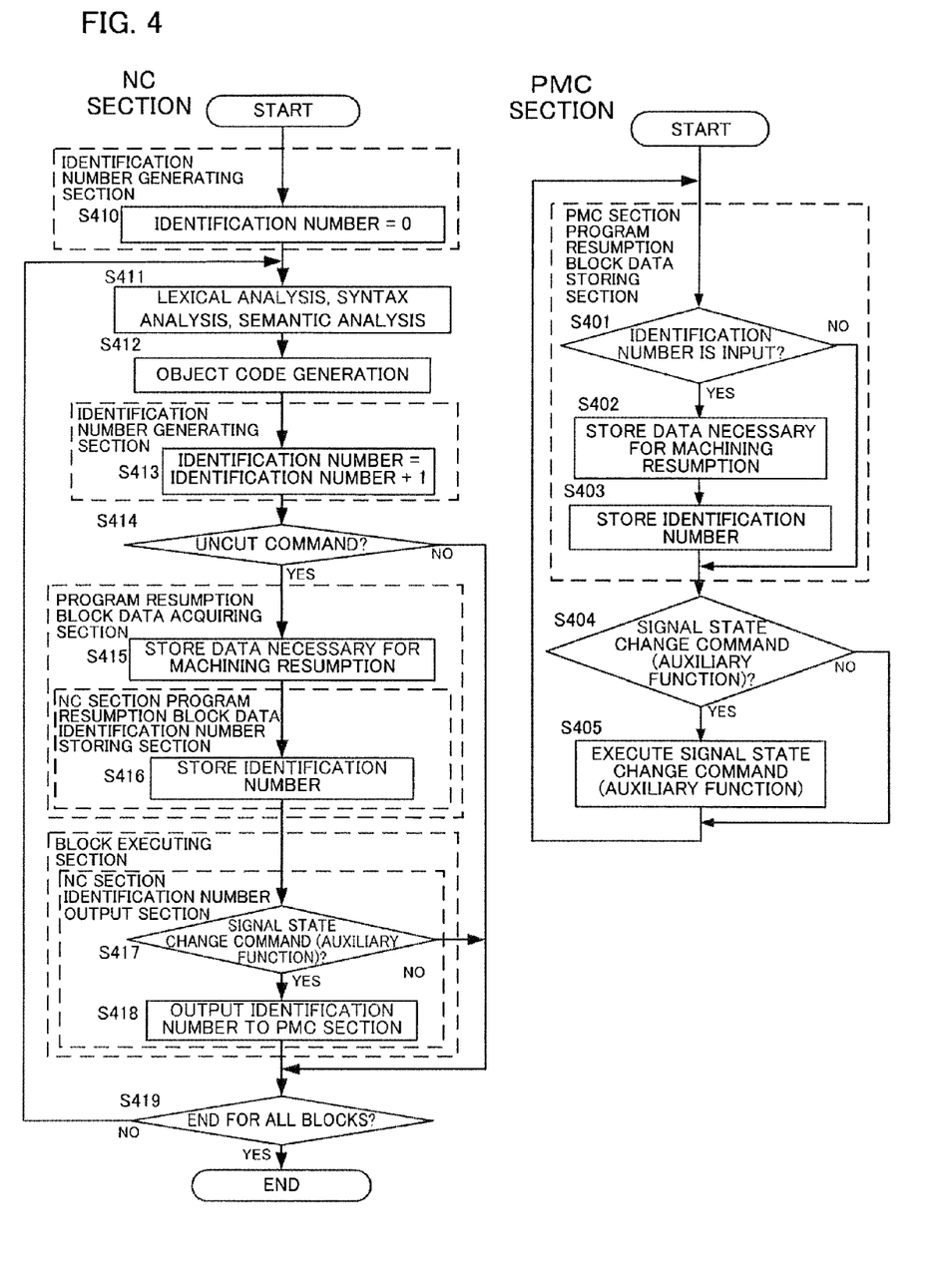
FIG. 4 is a diagram for explaining an operation example of the NC section and a PMC section during machining in the numerical controller.

FIG. 4 is a flowchart for explaining an operation example of the NC section and the PMC section during machining.

At timing when the identification number is communicated from the NC section 101 to the PMC section 120, a PMC section program resumption block data storing section shown in FIG. 4 stores 'data necessary for machining resumption in the PMC section 120' and the identification number associated with each other in the memory of the PMC section 120 (the nonvolatile memory 122 or the volatile memory 123 of the memory 121) as PMC section program resumption block data. The 'data necessary for machining resumption in the PMC section 120' includes, in general, a signal state at an instance when the identification number is communicated from the NC section 101 and data for controlling the peripheral machine section 128.

Operation in the NC Section

The identification number generating section initializes an identification number when machining is started (step S410). Subsequently, read out of a character string of a program for one block and a lexical analysis, a syntax analysis, a semantic analysis, and object code generation are performed by the original operation of NC section (steps S411 and S412). When object codes are generated, the identification number generating section generates identification numbers unique to the object codes (step S413).

If this block is an uncut command (step S414), the program resumption block data acquiring section stores data necessary for machining resumption (step S415) and stores the identification number generated by the identification number generating section (step S413) in association with the data (step S416).

When the object code is executed, the NC section identification number output section discriminates content of the object code. When a discriminated command is a signal state change command, the NC section identification number output section outputs the identification number generated by the identification number generating section (step S413) to the PMC section (step S418). These operations are performed for each of blocks until the program ends (step S419). In the operations shown in the flowchart of FIG. 4, positive integers 0, 1, 2, and the like are used as the identification number.

Operation in the PMC Section

The PMC section monitors the identification number output in step S418 in the NC section. First, the PMC section determines whether the identification number is input or not (step S401). If the identification number is input, the PMC section stores data necessary for machining resumption (step S402) and stores the identification number (step S403). On the other hand, if the identification number is not input, the PMC section does not execute steps S401 and S402 and determines whether a signal state change command (the auxiliary function) is output or not (step S404). If the signal state change command is output, the PMC section executes the signal state change command (the auxiliary function) (step S405). Steps S401 to S403 are operations of a PMC section program resumption block data storing section. Steps S404 and S405 are processing of the PMC section during the output of the signal state change command (the auxiliary function) performed in general.

Figure 5:
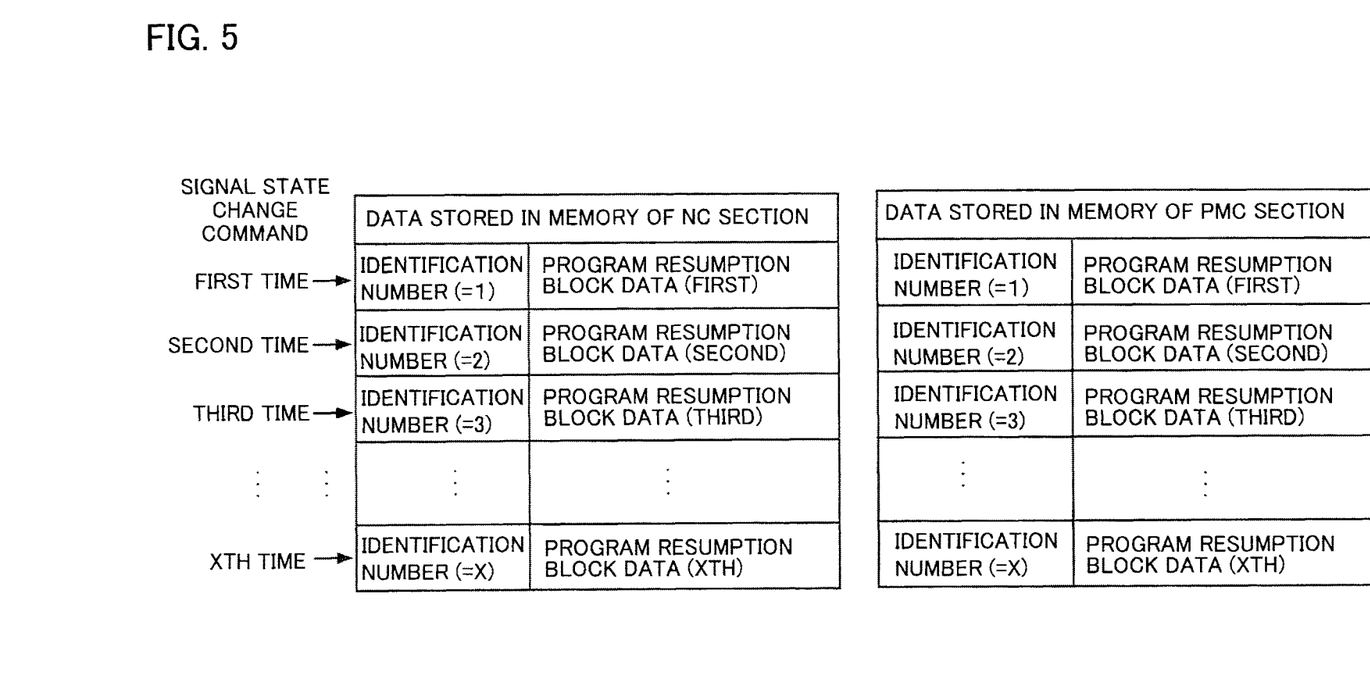
FIG. 5 is a diagram for explaining a state in which sets of identification numbers and program resumption block data are respectively stored in memories of the NC section and the PMC section every time a signal state change command is issued.

When the data necessary for resumption of the machining is acquired in this way, as shown in FIG. 5, a set of an identification number and program resumption block data is stored in each of the memories of the NC section and the PMC section every time the signal state change command is issued.

As shown in FIG. 5, if all PMC section program resumption block data are stored in time series, only data changed from the previous time has to be stored in the individual PMC section program resumption block data. This is because it is possible to restore all states by restoring all the PMC section program resumption block data in order from one having the smallest identification number.

In the above explanation, the operation during the machining execution by the machine tool controlled by the numerical controller according to the present invention is explained. An example of an operation during resumption of machining after suspension of machining is explained below. In this machining resumption, first, the NC section operates and restores internal data of the NC section. Thereafter, the NC section causes the PMC section to restore a signal state and a state of the peripheral machine section. When the restoration is completed, the NC section continues the resumption of the machining.

Figure 6:
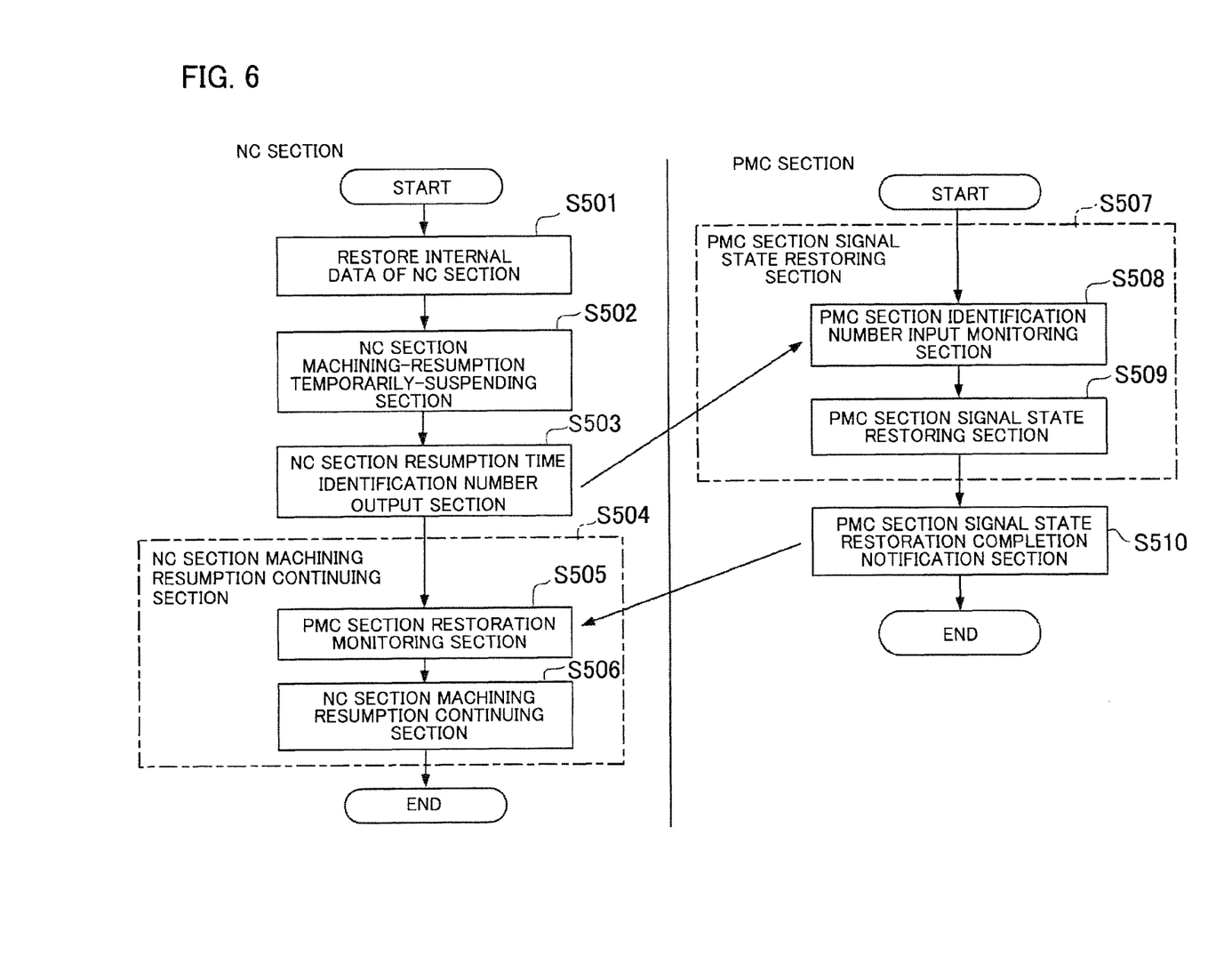
FIG. 6 is a diagram for explaining an operation example of the NC section and the PMC section during a machining resumption in the numerical controller.

Operations of the NC section and the PMC section in this case are shown in FIG. 6.

When restoration of internal data of the NC section (step S501) is completed, the NC section shifts to a machining resumption suspension state with an NC section machining-resumption temporarily-suspending section (step S502). After shifting to the machining resumption suspension state, the NC section takes measures for preventing machining from being resumed by mistake before preparation for machining resumption is completed, for example, neglects a start button for a program.

Subsequently, the NC section extracts, with an NC section resumption time identification number output section (step S503), an identification number from NC section program resumption block data selected at the start of a program resuming function, inputs the identification number to an interface signal between the NC section and the PMC section (step S503), and executes the operation of an NC section machining resumption continuing section (step S504 and S505).

On the other hand, the PMC section monitors, in a PMC section signal state restoring section (step S507), the interface signal between the NC section and the PMC section (step S508). The PMC section executes the operation of the PMC section signal state restoring section (step S509) at timing when the identification number is input from the NC section (i.e., timing when the identification signal is output from the NC section to the PMC section by the NC section resumption time identification number output section (step S503)) and restores a signal state and a state of the peripheral machine section using the data shown in FIG. 5.

When the restoration is completed, with a PMC section signal state restoration-completion notifying section (step S510), the PMC section notifies the NC section, through the interface signal between the NC section and the PMC section, of the fact that the PMC section completes the restoration of the signal state and the state of the peripheral machine section. When notifying this, a PMC section restoration monitoring section (step S505) monitors the completion of the PMC section. When the completion of the PMC section is detected, the NC section cancels a machining resumption suspension state with the NC section machining resumption continuing section (step S506) and shifts to a state in which the machining can be resumed, for example, a state in which the start button is enabled.

Consequently, states same as states before the machining suspension are restored for all of the NC section, the PMC section, and the peripheral machine section. Therefore, it is possible to start the rest of the machining from this state.

Figure 7:
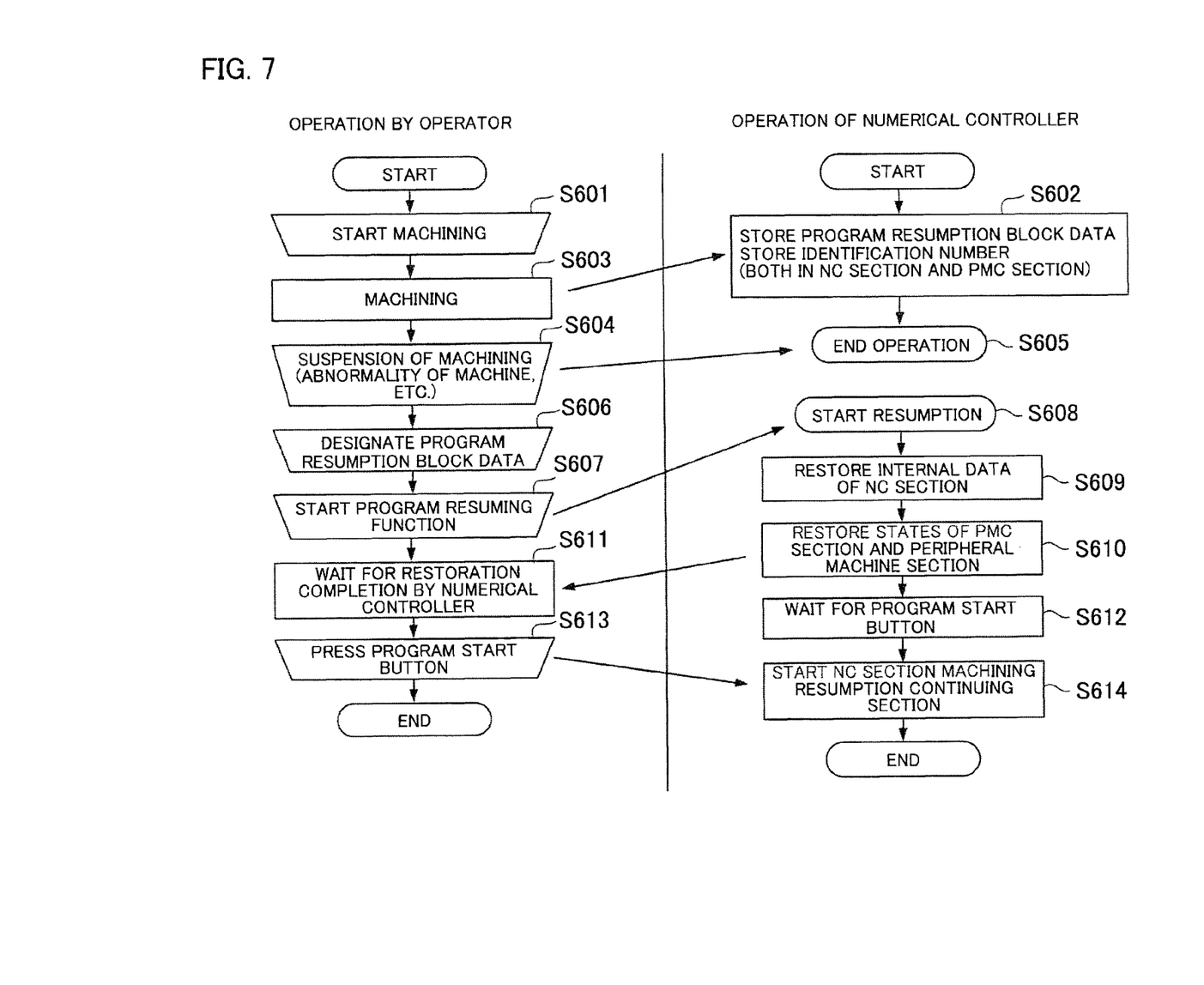
FIG. 7 is a diagram for explaining a flow of operation from a machining start to a machining resumption.

In FIG. 7, an operation example by the operator and an example of the operation of the numerical controller responding to the operation are shown concerning an overall flow from a start of machining, suspension of the machining, and a resumption of the machining performed when the present invention is carried out.

When the operator starts machining (step S601), if an uncut block is commanded to the numerical controller during the machining, storage of NC section program resumption block data is performed. If a signal state change command is output, PMC section program resumption block data is also stored (step S602). When the machining is suspended because of an abnormality of the machine, a power failure, or the like (step S604), the operation of the program once ends (step S605).

In order to resume the suspended machining, the operator designates any one of a plurality of NC section program resumption block data (step S606) and runs a program resuming function (step S607). In response to the running of the program resuming function, the numerical controller starts an operation for machining resumption (step S608), starts restoration of internal data of the NC section on the basis of the NC section program resumption block data (step S609), and subsequently restores states of the PMC section and the peripheral machine section (step S610). Although not shown in the figure, step S610 is configured by the NC section resumption time identification number output section (see step S503 in FIG. 6), the PMC section signal state restoring section (see step S507 in FIG. 6), and the PMC section signal state restoration-completion notifying section (see step S510 in FIG. 6).

When the operator activates the program resuming function (step S607), the operator waits for completion of the restoration on the side of the numerical controller (step S611). When the restoration of the states is completed, the numerical controller waits for the program start button to be pressed (step S612). The operator checks the completion of the restoration on the side of the numerical controller, checks safety, and then presses the program start button (step S613). In response to the pressing of the program start button, the numerical controller activates the NC section machining resumption continuing section (step S614). Then, the machining is resumed. Note that since steps S611, S612, and S613 are steps provided for the operator to check safety before the machining start, these steps may be omitted.

An embodiment is explained below in which an external PLC (programmable logic controller), a computer, or the like on the outside connected to the NC section assumes the role of the PMC section explained above. This embodiment is different from the embodiment explained above in that a method (a communication protocol, etc.) for exchanging various kinds of information between the NC section and the PLC, the computer, or the like on the outside in the NC section identification number output section, the NC section resumption time identification number output section, the PMC section signal state restoration-completion notifying section, and the NC section machining resumption continuing section is different from the method of exchanging information between the NC section and the PMC section in the embodiment explained above. This embodiment is also different from the embodiment explained above in that, instead of the PMC section, the PLC, the computer, or the like carries out functions equivalent to the PMC section program resumption block data storing section, the PMC section signal state restoring section, and the PMC section signal state restoration-completion notifying section. Contents of the information treated by the PLC, the computer, or the like are the same as the contents of the information in the embodiment explained above.

A program resuming function included in the numerical controller according to the present invention is complementarily explained below.

In performing machining of a workpiece, the numerical controller sequentially reads out blocks of a machining program stored in a memory and analyzes and executes the blocks to thereby control a motor connected to the NC section (see FIG. 1) of the numerical controller and control a machine section such as a peripheral apparatus (hereinafter referred to as peripheral machine section) attached to a machine via an input-output interface of the PMC section (see FIG. 1) of the numerical controller.

In order to easily perform resumption of machining of a workpiece when the machining of the workpiece is suspended, the numerical controller has a program resuming function for detecting in advance, during execution of a machining, an uncut block in which the resumption of the machining of the workpiece is easily performed, storing information concerning the uncut block in the memory as program resumption block data, and performing the resumption of the machining of the workpiece on the basis of the program resumption block data when the machining of the workpiece is suspended.

Further, the numerical controller has a program resuming function for accurately restoring a signal state of the numerical controller and a state of the peripheral machine section when the uncut block detected during execution of the machining is selected as program resumption block data and a resuming operation is performed.

When an auxiliary function (a signal state change command) is commanded during execution of machining of the workpiece, the program resumption block data, which is data for resuming the machining, is stored in the memory of the NC section of the numerical controller shown in FIG. 1. When the program resumption block data is stored, the program resumption block data is attached with a unique identification number and stored. During execution of machining of the workpiece, simultaneously with outputting an auxiliary function signal to the PMC section that performs control of the peripheral machine section, in order to notify the PMC section of timing for the PMC section to store PMC section program resumption block data, which is data necessary for machining resumption, the NC section also outputs the identification number to the PMC section. At timing when the identification number is output, the PMC section stores the PMC section program resumption block data in the memory of the PMC section. When storing the PMC section program resumption block data, the PMC section also stores correspondence between the identification number and the PMC section program resumption block data.

The numerical controller includes the "NC section program resumption block data identification number storing section", the "NC section identification number output section", and the "PMC section program resumption block data storing section". These sections are explained below.

The "NC section program resumption block data identification number storing section" adds the identification number to the NC section program resumption block data and stores the NC section program resumption block data in the memory of the NC section. The signal state change command (the auxiliary function) is a type of uncut block. Information concerning the block is stored in the memory of the NC section as the NC section program resumption block data. When the information is stored, a unique identification number is attached to the NC section program resumption block data.

The "NC section identification number output section" notifies the PMC section of timing for storing data necessary for resumption. That is, during execution of the signal state change command, the "NC section identification number output section" outputs the identification number to the PMC section and notifies the PMC section of timing when the PMC section stores data necessary for machining resumption.

In response to the notification of the identification number by the "NC section identification number output section", the "PMC section program resumption block data storing section" stores, in the PMC section, data necessary for machining resumption among data of the PMC section.

Since it is likely that a plurality of signal state change commands are issued in a program, it is necessary to distinguish a signal state change command that corresponds to data stored. Therefore, the data is stored in association with the identification number. As explained above, since the identification number is a unique value, even when a plurality of signal state change commands are issued, it is possible to distinguish the signal state change commands.

In this way, the NC section program resumption block data and the PMC section program resumption block data are respectively stored separately in the memoires of the NC section and the PMC section. However, it is possible to associate the NC section program resumption block data and the PMC section program resumption block data by associating the data with the identification number common to the NC section and the PMC section.

A numerical controller according to an embodiment of the present invention is explained below.

During resumption of machining, when one of the program resumption block data is designated and the program resuming function is started, the NC section outputs an identification number attached to the program resumption block data in order to notify the PMC section of timing for restoring a signal state and a state of the peripheral machine section. At this timing, the PMC section restores the signal state and the state of the peripheral machine section using PMC section program resumption block data matching the identification number and notifies the NC section that the restoration of the signal state and the state of the peripheral machine section is completed. In response to the notification, the NC section continues the resumption of the machining. Consequently, during the machining resumption, it is possible to restore both of the NC section and the PMC section to states same as states during execution of machining of a workpiece and then start the machining.

The numerical controller according to this embodiment further includes the "NC section machining-resumption temporarily-suspending section", the "NC section resumption time identification number output section", the "PMC section signal state restoring section", the "PMC section signal state restoration-completion notifying section", and the "NC section machining resumption continuing section". These sections are explained below.

After suspension of machining, when one of the NC section program resumption block data stored in the NC section is selected and the program resuming function is activated, the NC section searches for a block in which the machining should be resumed and arranges modal information and the like of an execution pointer and a G code of a program such that operation can be started from the block. Subsequently, the "NC section machining-resumption temporarily-suspending section" temporarily suspends the operation of the machining resumption and shifts to a state for performing restoration of a signal state by the PMC section. After the temporary suspension of the operation of the machining resumption, the restoration of the signal state by the PMC section is started by the "NC section resumption time identification number output section".

The "NC section resumption time identification number output section" notifies the PMC section of timing for the restoration of the state. The "NC section resumption time identification number output section" is activated when the operation of the machining resumption is temporarily suspended by the "NC section machining-resumption temporarily-suspending section". The "NC section resumption time identification number output section" notifies the PMC section of the identification number of the NC section program resumption block data selected at the activation of the program resuming function. At timing of reception of the notification, the "PMC section signal state restoring section" is started and the restoration of the state in the PMC section is started.

When a plurality of signal state change commands are issued in the machining program, as explained above, a plurality of PMC section program resumption block data are also stored in the PMC section. Therefore, to restore the signal state for resumption of the machining using the PMC section program resumption block data, the PMC section needs to recognize which of the plurality of PMC section program resumption block data should be used.

As explained above, a common identification number is attached to the NC section program resumption block data (stored in the NC section) and the PMC section program resumption block data (stored in the PMC section). Therefore, if the NC section notifies the PMC section of the identification number, the PMC section can obtain the PMC section program resumption block data corresponding to the identification number.

In response to the notification of the identification number from the NC section to the PMC section by the "NC section resumption time identification number output section", the "PMC section signal state restoring section" refers to the identification number and restores the signal state and the state of the peripheral machine section using the PMC section program resumption block data having the same identification number.

When the signal state and the state of the peripheral machine section are restored by the "PMC section signal state restoring section", the "PMC section signal state restoration-completion notifying section" notifies the NC section to that effect.

In response to the notification from the "PMC section signal state restoration-completion notifying section", the operation of the "NC section machining resumption continuing section" is executed. Consequently, the operation of the machining resumption temporarily suspended by the "NC section machining-resumption temporarily-suspending section" is restarted. Movement to a machining start point and execution of the machining program (start of actual machining) are started.

A numerical controller according to another embodiment of the present invention is explained below.

In this embodiment, the role of the PMC section in the numerical controller explained above is carried out by a PLC, a computer, or the like connected to the NC section.

When the PMC section performs the control of the peripheral machine section, the "NC section identification number output section", the "NC section resumption time identification number output section", and the "PMC section signal state restoration-completion notifying section" in the numerical controller explained above perform notification with one another using the interface signal between the NC section and the PMC section. However, when the PLC, the computer, or the like on the outside connected to the NC section performs the control of the peripheral machine section, the notification is performed by communication through an Ethernet (registered trademark) or the like instead of the interface signal between the NC section and the PMC section.

What is claimed is:

1. A numerical controller (NC) having a program resuming function, the numerical controller including:
   an NC section that sequentially reads out blocks of a machining program to thereby control a motor connected to the numerical controller;
   and a programmable machine controller (PMC) section that receives a signal state change command from the NC section, decodes the signal state change command by a sequence program, and controls a peripheral machine section connected to an input-output interface mounted on the numerical controller, using the signal obtained by decoding, wherein the numerical controller controls each of the NC section and the PMC section to perform machining of a workpiece, and the numerical controller has the program resuming function for detecting in advance, with the NC section during execution of machining, an uncut block in which the machining of the workpiece is easily resumed, in order to resume the machining of the workpiece when the machining of the workpiece is suspended, storing one or a plurality of items of information concerning the uncut block in a memory of the NC section as NC section program resumption block data, and performing resumption of the machining of the workpiece on the basis of the NC section program resumption block data arbitrarily selected after the machining of the workpiece is suspended, and wherein the numerical controller further comprises:

an NC section program resumption block data identification number storing section that adds, when the information concerning the uncut block is stored as the NC section program resumption block data during execution of machining of the workpiece, a unique identification number to the information concerning the uncut block and stores the information concerning the uncut block;

an NC section identification number output section that outputs the identification number added to the NC section program resumption block data corresponding to the signal state change command, to the PMC section, every time a signal state change command for outputting a signal from the NC section to the PMC section is executed by the NC section for the purpose of causing the PMC section to perform mainly operation of the peripheral machine section during execution of machining of the workpiece, and notifies the PMC section of timing for storing data necessary for the resumption; and a PMC section program resumption block data storing section that stores the PMC section program resumption block data, which includes the signal state obtained by decoding, by the sequence program, the signal state change command received from the NC section and data with which the PMC section controls the peripheral machine section, in a memory of the PMC section, at a timing when the identification number is output by the NC section identification number output section, in the PMC section.

2. The numerical controller having a program resuming function according to claim 1, further comprising:

an NC seen machining-resumption temporarily-suspending section that temporarily suspends, when any one of the NC section program resumption block data is designated and the program resuming function is started after the machining is suspended, a machining resuming operation of the NC section halfway in a process for resuming the machining of the workpiece on the basis of the designated NC section program resumption block data;

an NC section resumption time identification number output section that outputs an identification number of the NC section program resumption block data designated at the start of the program resuming function, to the PMC section, after detecting that the machining resuming operation of the NC section is temporarily suspended by the NC section machining resumption temporarily-suspending section, and notifies the PMC section of timing for restoring the state;

a PMC section signal state restoring section that causes the PMC section to restore the signal state of the numerical controller, obtained by decoding the signal state change command, and a state of the peripheral machine sections on the basis of the identification number, at a timing when the identification number is output from the NC section to the PMC section;

a PMC section signal state restoration-completion notifying section that notifies, when the restoration of the signal state and the state of the peripheral machine section is completed, the NC section of the completion; and an NC section machining resumption continuing section that causes the NC section to continue the resumption of the machining suspended by the NC section machining-resumption temporarily-suspending section, in response to the restoration of the signal state by the PMC section signal state restoration-completion notifying section.

3. A numerical controller (NC) having a program resuming function, the numerical controller including:

an NC section that sequentially reads out blocks of a machining program to thereby control a motor connected to the numerical controller; and a programmable machine controller (PMC) section that receives a signal state Change command from the NC section, decodes the signal state change command by a sequence program, and controls a peripheral machine section connected to an input-output interface mounted on the numerical controller, using the signal obtained by decoding, wherein the numerical controller controls each of the NC section and the PMC section to perform machining of a workpiece, and the numerical controller has the program resuming function for detecting in advance, with the NC section during execution of machining, an uncut block in which the machining of the workpiece is easily resumed, in order to resume the machining of the workpiece when the machining of the workpiece is suspended, storing one or a plurality of items of information concerning the uncut block in a memory of the NC section as NC section program resumption block data, and performing resumption of the machining of the workpiece on the basis of the NC section program resumption block data arbitrarily selected after the machining of the workpiece is suspended, and wherein the numerical controller further comprises:

an NC section program resumption block data identification number storing section that adds, when the information concerning the uncut block is stored as the NC section program resumption block data during execution of machining of the workpiece, a unique identification number to the information concerning the uncut block and stores the information concerning the uncut block;

an NC section identification number on output section that outputs the identification number added to the NC section program resumption block data corresponding to the signal state change command, to the PMC section, every time a signal state change command for outputting a signal from the NC section to the PMC section is executed by the NC section for the purpose of causing the PMC section to perform mainly operation of the peripheral machine section during execution of machining of the workpiece, and notifies the PMC section of timing for storing data necessary for the resumption; and a PMC section program resumption block data storing section that stores the PMC section program resumption block data, which includes the signal state obtained by decoding, by the sequence program, the signal state Change command received from the NC section and data with which the PMC section controls the peripheral machine section, in a memory of the PMC section, at a timing when the identification number is output by the NC section identification number output section, in the PMC section, wherein the PMC section is a programmable logic controller (PLC) or a computer connected through communication line.

4. The numerical controller having a program resuming function according to claim 3, further comprising:

an NC seen machining-resumption temporarily-suspending section that temporarily suspends, when any one of the NC section program resumption block data is designated and the program resuming function is started after the machining is suspended, a machining resuming operation of the NC section halfway in a process for resuming the machining of the workpiece on the basis of the designated NC section program resumption block data;

an NC section resumption time identification number output section that outputs an identification number of the NC section program resumption block data designated at the start of the program resuming function, to the PMC section, after detecting that the machining resuming operation of the NC section is temporarily suspended by the NC section machining-resumption temporarily-suspending section, and notifies the PMC section of timing for restoring the state;

a PMC section signal state restoring section that causes the PMC section to restore the signal state of the numerical controller, obtained by decoding the signal state change command, and a state of the peripheral machine section, on the basis of the identification number, at a timing when the identification number is output from the NC section to the PMC section;

a PMC section signal state restoration-completion notifying section that notifies, when the restoration of the signal state and the state of the peripheral machine section is completed, the NC section of the completion;

and an NC section machining resumption continuing section that causes the NC section to continue the resumption of the machining suspended by the NC section machining-resumption temporarily-suspending section, in response to the restoration of the signal state by the PMC section signal state restoration-completion notifying section.

* * * * *